United States Patent Office 3,278,308
Patented Oct. 11, 1966

3,278,308
DIHYDROQUINOLINES ACTIVATED WITH
8-HYDROXYQUINOLINE
Gino J. Marco, Webster Groves, Mo., assignor to
Monsanto Company, a corporation of Delaware
No Drawing. Filed July 26, 1962, Ser. No. 212,734
12 Claims. (Cl. 99—2)

This invention relates to the activation of antioxidants. More particularly, the invention is directed to products which improve the preservation of vitamins in foodstuffs and particularly in animal feeds and components thereof, which have heretofore been stabilized by the use of conventional antioxidants.

It is well known that the carotene in dehydrated alfalfa and other forage crops are subject to oxidation and loss of vitamins, particularly vitamin A, under normal storage and processing conditions. Furthermore, animal feeds which include the dehydrated forage crops and other vitamin containing components may undergo further decomposition, such that animals fed thereon are subject to malnutrition and more serious disabilities attributable to deficiencies in essential vitamins. It has also been found that many animals have the ability to store vitamins, and the longevity of retention of these vitamins for future use will be extended if antioxidants are included in the animal diets. The animal industry now regularly feeds antioxidants to animals as a feed component. The commercial manufacturers of prepared feeds also include antioxidants if the formulation includes vitamins and vitamin containing components, such as dehydrated alfalfa and other forage crops. Such feeds have the ability to retain their full nutrient qualities through the storage periods incident to normal marketing conditions.

Of the many known antioxidants, for example those developed by the rubber processing industry, only a few have been found to be useful for stabilization of vitamins. Of these the dihydroquinolines have been found to be very active and have been widely used in animal feeds. The most useful and more abundantly available dihydroquinolines are the 2,2,4-trimethyl-1,2-dihydroquinolines of the structure

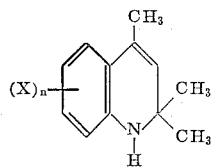

wherein $n$ is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms, and alkoxy radicals having up to 4 carbon atoms.

To determine the relative merits of antioxidants, many different procedures are used. Since many of the oxidations, which the antioxidants are intended to retard, are very slow reactions, accelerated procedures have been developed. Unfortunately, these are often arbitrary and frequently do not provide realistic evaluation or true indications of antioxidant properties. Obviously, test procedures should similate conditions encountered in actual use of the substances to inhibit oxidations. However, accelerated tests, which are essential to a speedy and efficient acquisition of the critical data, may be used, if they are carefully calibrated with the actual oxidation reactions in the presence of a standard antioxidant of known quality.

To be most significant the antioxidant substances are screened to determine their ability to retard the oxidation of carotene. Under identical conditions, the effect of a standard antioxidant 6-ethoxy-2,2,4-trimethyl-1,2 dihydroquinoline in stabilizing carotene is also determined. Each candidate antioxidant is rated with respect to activity as a percentage of the activity of the standard antioxidant. The following activities of known antioxidants were determined by this procedure.

| Antioxidant | Percent of standard compound activity | |
|---|---|---|
| Butylated hydroxy anisol | 28.2 | 106.4 |
| α-Tocopherol (Vit. E) | 25.5 | 43.5 |
| Butylated hydroxy toluene | 17.5 | 74.1 |
| Propyl gallate | 11.4 | 24.1 |

The purpose of the present invention is to provide methods of improving the vitamin protective properties of any and all antioxidants, and especially those above identified. Most particularly, the activity of the 2,2,4-trimethyl - 1,2 - dihydroquinolines may be increased. Specifically, the fundamental purpose of this invention is to provide a means of improving the 6-ethoxy-2,2,4-trimethyl-1,2-dihydroquinoline and to produce antioxidant compositions of superior activity in the preservation of vitamins in feed compositions.

It has been found that certain classes of compounds activate the antioxidant properties of even the best antioxidants. These activators are not antioxidants, and many of them are pro-oxidants, promoting oxidation reactions instead of inhibiting the undersired oxidations. It has been found that some compounds having mild antioxidant properties have the ability to greatly increase the antioxidant properties of the above-described 2,2,4-trimethyl-1,2-dihydroquinolines. It has been found that 8-hydroxyquinoline will increase the antioxidant properties of the 2,2,4-trimethyl-1,2-dihydroquinolines above identified, as well as butylated hydroxyanisole, butylated hydroxytoluene, propyl gallate and α-tocopherol.

Example 1

Using a standardized sample of carotene the stabilizing effects of 8-hydroxyquinoline and 6-ethoxy-2,2,4-trimethyl-1,2-dihydroquinoline were measured under identical conditions. The latter compound was used as a standard and the antioxidant activity of the 8-hydroxyquinoline was determined as a percentage of the activity of the 6-ethoxy-2,2,4-trimethyl-1,2-dihydroquinoline.

In these tests a 15 microgram sample of 8-hydroxyquinoline was studied alone and compared with a 15 microgram sample of 6-ethoxy-2,2,4-trimethyl-1,2-dihydroquinoline in a standard carotene emulsion. A sample comprised of 15 micrograms of the latter test compound and 5 micrograms of the 8-hydroxyquinoline was also studied under the same conditions to determine its antioxidant properties. The following table sets forth the observed data.

| Compound | μg. | Antioxidant rating [1] | |
|---|---|---|---|
| (A) 6-ethoxy-2,2,4-trimethyl-1,2-dihydroquinoline | 15 | 100 | |
| (B) 8-hydroxyquinoline | 15 | −2.9 | 3.5 |
| (A) 15μg.+(B) 5μg. | | 141.0 | 156.5 |

[1] Ratings based on percent of activity of (A) alone, assuming (A) to be 100.

Example 2

The 8-hydroxyquinoline is an active metal chelating compound. To determine the relationship of the antioxidant stabilization to the chelating property the additional compounds (B), known to form metal chelates, were studied to ascertain the antioxidant effects of 15 micrograms of each in the carotene stabilization test. Mixtures of 5 micrograms of each and 15 micrograms of 6 - ethoxy - 2,2,4-trimethyl-1,2-dihydroquinoline (A) were used for comparison.

| Micrograms | Compound (B) | |
|---|---|---|
| 15(A) | 6-ethoxy-2,2,4-trimethyl-1,2-dihydroquinoline | 100 |

TEST COMPOUND

| | | |
|---|---|---|
| 15 | 8-hydroxy-5-quinoline sulfonic acid | 19.1 |
| 15(A)+5 | do | 109.5 |
| 15 | Ethylenediamine tetraacetic acid | 18.8 |
| 15(A)+5 | do | 96.9 |
| 15 | Thiourea | 31.3 |
| 15(A)+5 | do | 114.1 |
| 15 | Thioacetamide | -2.4 |
| 15(A)+5 | do | 107.3 |
| 15 | Citric acid | 14.6 |
| 15(A)+5 | do | 85.4 |
| 15 | Salicylic acid | -4.9 |
| 15(A)+5 | do | 87.8 |
| 15 | N,N-dimethyl p-phenylene diamine | 71.4 |
| 15(A)+5 | do | 71.4 |
| 15 | Salicylaldoxine | 33.3 |
| 15(A)+5 | do | 113.0 |
| 15 | Rhodanine | 3.9 |
| 15(A)+5 | do | 101.9 |
| 15 | Picric acid | 6.4 |
| 15(A)+5 | do | 93.7 |
| 15 | 2,2-biquinoline | -3.2 |
| 15(A)+5 | do | 14.3 |

The above table of data demonstrates that there is no significant relationship between the activation of antioxidants and the ability of the compound to chelate metals. In most of the above experiments, the antioxidant properties of the standard antioxidant 6-ethoxy-2,2,4-trimethyl-1,2-dihydroquinoline were reduced by the presence of the chelating agent. With respect to only a few compounds, thiourea, salicylaldoxine and the 8-hydroxy-5-quinoline sulfonic acid, a slight improvement was effected, but not much more than would be expected from the sum of the individual antioxidant properties.

Mixtures of the antioxidants and the activators as above described may be prepared in advance and used as such in preventing or controlling undesired oxidation reactions. When added to the substances which are subject to deleterious oxidation, they are useful in stabilizing said substances during preparation, storage or use. Generally, they are gradually consumed while they are effecting the stabilization. The compounds may be added to the substances being stabilized as separate components and mixing the composition to effect an intimate dispersion. Many compositions contain the substances to be stabilized as only minor components and the small amount of antioxidant used is difficult or impossible to attain the necessary degree of dispersion for effective control of the oxidation reactions.

It has been found that the antioxidant compositions are prepared by use of 20 to 90% of the antioxidants, such as 6 - ethoxy - 2,2,4-trimethyl-1,2-dihydroquinoline and from 80 to 10 percent of the active compound. Preferred compositions may contain the principle antioxidant in quantities such that the maximum is from 70 to 80% and the minimum from 40 to 50%, the balance of these compositions being the activating compound. It has been found that very large amounts of non-antioxidant activators may produce a diluting effect without a complete compensatory activation of the antioxidant. Some of the activators are in themselves antioxidants and these may provide additional antioxidant capacity as well as providing the more important activation effect.

The activated antioxidant compositions may be used in any application where oxidation produces undesirable effects. They may be used to prevent the aging of rubber and plastic compositions. They may be used to prevent decomposition of food products. Antioxidants are desirable in compositions containing unsaturated oils, subject to oxidation, and spoilage. A very important use is to prevent the normal loss of vitamins by oxidation in food stuffs or food components. Antioxidants are conventional in animal foods and in this area finds one of its principle uses.

In the prepartion of animal feeds conventional practice involves the incorporation of many substances subject to oxidative decomposition which destroy the nutrient values or render them less patentable. For example, oils with unsaturated components, dehydrated alfalfa, vitamin concentrates, tallow, soybean oil, tall oil, meals from oil processing industries, proteins and antibiotics. To prevent unwanted decomposition of the oxidizable components it is conventional to incorporate antioxidants. The use of these new activated antioxidant compositions will enable the desired stabilization with less antioxidant or a more efficient and longer lived stabilization with the use of conventional quantities.

In addition to the above mentioned components, animal feeds may include proteins, such as gellatin, casein, fish meal and slaughterhouse refuse; amino acids, such as glycene, methionine, the calcium salt of 2-hydroxy-4-methyl-thiobutyric acid and lycene; minerals, such as bone meal, salt, rock phosphate; and trace minerals such as the salts of zinc, copper, manganese, magnesium, cobalt, iron and iodine; medicants, such as antibiotics, coccidiostats, anthelmintics and steroids; cellulosive roughage components such as hay, straw, cottonseed hulls, cotton mill wastes, beet pulp, silage, ground corn cobs, corn stalks, oats, barley, cereal brans and cereal middlings. Other conventional components well known to the animal raising arts may also be included in the finished feeds. In general, the invention may be practiced by replacing the normal antioxidant in any feed composition now in use with the activated antioxidant to attain the above-described beneficial results.

Although the invention is described with respect to specific modifications, it is not intended that the details thereof are limitations on the scope of the invention, except to the extent incorporated in the following claims.

The embodiments of the invention in which an exclusive property or privilege is claimed are defined as follows:

1. An improved antioxidant composition comprising 8-hydroxyquinoline and an antioxidant of the formula

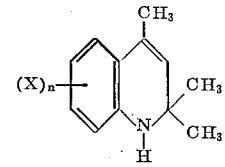

wherein $n$ is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms and alkoxy having up to 4 carbon atoms, said 8-hydroxyquinoline being present in an amount sufficient to provide an enhanced antioxidant property.

2. An improved antioxidant comprising from 20 to 90% by weight of a 2,2,4-trimethyl-1,2-dihydroquinoline and from 80 to 10 percent of 8-hydroxyquinoline.

3. An improved antioxidant composition comprising a 6-ethoxy-2,2,4-trimethyl-1,2-dihydroquinoline and sufficient 8-hydroxy quinoline to provide an enhanced antioxidant property.

4. A method of stabilizing a substance subject to degradative oxidation which comprises adding to the said substance 8-hydroxyquinoline and an antioxidant of the formula

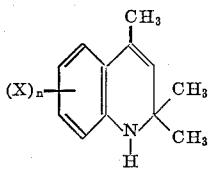

wherein n is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms and alkoxy having up to 4 carbon atoms, said 8-hydroxyquinoline being present in an amount sufficient to provide an enhanced antioxidant property.

5. A method of stabilizing substances subject to degradative oxidation which comprises adding to the said substances a 2,2,4-trimethyl-1,2-dihydroquinoline in the presence of sufficient 8-hydroxyquinoline to provide an enhanced antioxidant property.

6. A method of stabilizing substances subject to degradative oxidation which comprises adding to the said substances 6-ethoxy-2,2-4-trimethyl-1,2-dihydroquinoline in the presence of sufficient 8-hydroxyquinoline to provide an enhanced antioxidant property.

7. A feed composition comprising at least one conventional feed component and a mixture of 8-hydroxyquinoline and a compound of the formula

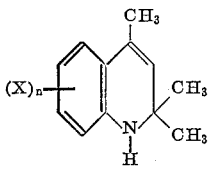

wherein n is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms and alkoxy having up to 4 carbon atoms, said 8-hydroxyquinoline being present in an amount sufficient to provide an enhanced antioxidant property.

8. A feed composition comprising at least one conventional feed component and a mixture of 2,2,4-trimethyl-1,2-dihydroquinoline and 8-hydroxyquinoline, said 8-hydroxyquinoline being present in an amount sufficient to provide an enhanced antioxidant property.

9. A feed composition comprising at least one conventional feed component and a mixture of 6-ethoxy-2,2,4-trimethyl-1,2-dihydroquinoline and 8-hydroxyquinoline, said 8-hydroxyquinoline being present in an amount sufficient to provide an enhanced antioxidant property.

10. A method of raising animals which comprises feeding said animals with a feed composition containing a mixture of 8-hydroxyquinoline and an antioxidant of the formula

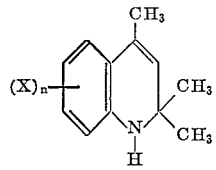

wherein n is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms and alkoxy having up to 4 carbon atoms, said mixture containing sufficient 8-hydroxyquinoline to provide an enhanced antioxidant property.

11. A method of raising animals which comprises feeding said animals with a feed composition containing as an antioxidant a mixture of from 20 to 90 percent by weight of a 2,2,4-trimethyl-1,2-dihydroquinoline and from 80 to 10 percent of 8-hydroxyquinoline.

12. A method of raising animals which comprises feeding said animals with a feed composition containing as an antioxidant a mixture of 40 to 70 percent by weight of 6-ethoxy-2,2,4-trimethyl-1,2-dihydroquinoline and 30 to 60 percent of 8-hydroxyquinoline.

References Cited by the Examiner

UNITED STATES PATENTS

| | | | |
|---|---|---|---|
| 2,562,970 | 8/1951 | Thompson | 99—8 |
| 2,686,723 | 8/1954 | Chenicek | 99—2 X |
| 2,711,962 | 6/1955 | Bickoff | 99—8 |
| 2,844,508 | 7/1958 | Weiss et al. | 167—33 |
| 2,935,449 | 5/1960 | Bavley | 99—2 |
| 3,141,775 | 7/1964 | Surgant | 99—9 |
| 3,149,117 | 9/1964 | Brown | 252—402 |
| 3,155,521 | 11/1964 | Ward et al. | 99—2 |

OTHER REFERENCES

Association of American Feed Control Officials, Official Publication 1955, p. 20, L. E. Bopst, College Park, Md.

Merck Index, 7th ed. 1960, p. 545, Merck & Co., Rathway, N.J.

A. LOUIS MONACEL, *Primary Examiner.*

D. DONOVAN, *Assistant Examiner.*